Oct. 26, 1954     E. STUMP     2,692,778
ROCKING AXLE SUSPENSION FOR MOTOR VEHICLES
Filed Oct. 28, 1950

INVENTOR
EUGEN STUMP
By:
Haseltine, Lake & Co.
AGENTS

Patented Oct. 26, 1954

2,692,778

UNITED STATES PATENT OFFICE 2,692,778

ROCKING AXLE SUSPENSION FOR MOTOR VEHICLES

Eugen Stump, Stuttgart-Unterturkheim, Germany, assignor to Daimler-Benz Aktiengesellschaft, Stuttgart-Unterturkheim, Germany Application October 28, 1950, Serial No. 192,689

Claims priority, application Germany October 31, 1949

4 Claims. (Cl. 280—112)

The present invention refers to a suspension of the rigid axles of motor vehicles, particularly commercial vehicles.

One object of the invention is to provide a simple, robust axle suspension, which can be manufactured at low cost, requires as little servicing as possible and still fulfills all requirements with respect to a good hold on the road. A further object of the invention is to provide good steering safety for such vehicles.

A still further object of the invention is to provide an improved transverse support of the rigid axles with reference to the chassis, particularly when use is made of cross steering or guide links, which are arranged transversely to the driving direction for support of the axle against the chassis, in order thereby to prevent lateral shimmying or shaking.

Still another object of the invention consists in the advantageous development of a joint of the ball and socket type, which renders the latter suitable for universal use.

Further objects of the invention will appear from the following description of an example of construction, which is illustrated diagrammatically in the drawing wherein.

Figure 1:
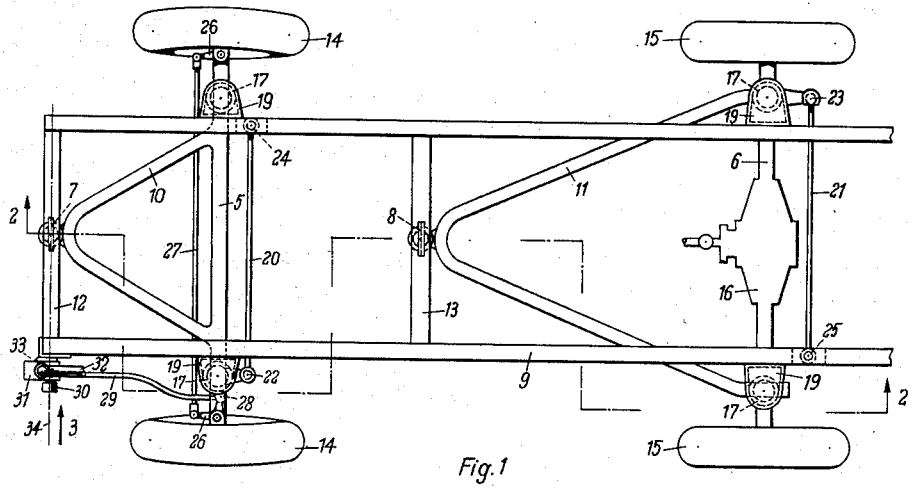
Figure 1 shows a motor vehicle frame provided with an axle suspension in plan view, the transmission and universal being omitted for the purpose of better visibility of the parts below them.
Figure 2:
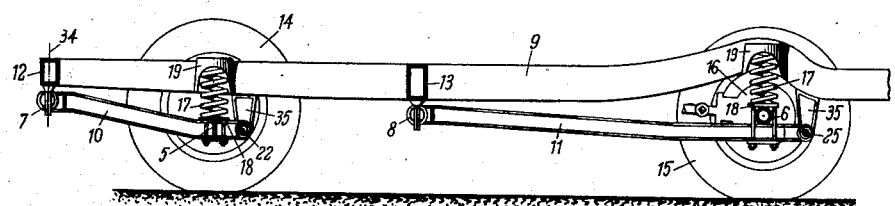
Figure 2 shows a section along the broken line 2—2 of Figure 1.
Figure 3:
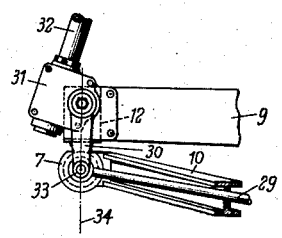
Figure 3 shows the foremost end of the vehicle frame, drawn to a larger scale in direction of the arrow 3 (Fig. 1)

In accordance with the example of construction illustrated, the front axle 5 and the rear axle 6 of the vehicle are developed as drawn rigid axles and are connected to the vehicle frame 9 by means of ball and socket type or universal joints at the points 7 and 8, which are each located ahead of the corresponding axle, in the central longitudinal plane of the vehicle frame 9. The connection is effected by cantilever pull and push supports or struts 10, 11, each of which forms with the corresponding vehicle axle a rigid triangle thereby to transfer to the frame 9 through the joints 7, 8 all horizontal longitudinal forces arising at the axle. For this purpose the frame 9 is provided with cross arms 12, 13. The front axle 5 supports in the known manner the steerable wheels 14, while the rear axle supports the driving wheels 15 of the vehicle, which are driven by a combustion engine with speed change gear, not shown in the drawing, through the differential gear 16.

In accordance with the invention, furthermore, the two axles 5, 6 are supported by helical springs in perpendicular direction against the vehicle frame 9. Each of the four springs is supported with its lower end against the corresponding axle, for example by means of disks 18, which are attached to the axles and with its upper end against cup-like abutments 19, which are rigidly attached to the vehicle frame. For absorption of the spring oscillations hydraulic shock absorbers, of known telescopic construction, can be attached inside or outside of the helical springs.

Transverse guides 20, 21, which are each connected at their one end with the corresponding axle at 22, 23 and with their other ends by a ball and socket type joint with the vehicle frame 9 at 24, 25, serve as a lateral guiding means for the axles 5 and 6, i. e. for transmission of horizontal transverse forces from the axles to the vehicle frame and inversely. The joints 24, 25 are located on opposite sides, i. e. in one diagonal of the vehicle frame, whereby unilateral parallel displacements of the entire vehicle upon rebounding of both axles are prevented, which cause a disagreeable lateral shimmying or shaking of the vehicle body particularly when a certain succession of unevenness of the road surface is encountered (series of mud-holes, head stone pavement or the like) and at a certain driving speed where the impact oscillations of the axles are tuned to the natural frequency of the car body.

The steering arms 26 of the two front wheels 14 are connected with each other in the known manner by a cross link 27 and the leading leg 28 of the left front wheel is connected with the leading or steering lever 30 through the guide rod 29, whereby the guiding box or steering gear 31 with the steering post 32 is arranged at the foremost end of the vehicle frame 9 in such a manner that the coupling point 33 of the guide rod 29 to the leading lever 30 for straight ahead position of the front wheels 14 is mainly located at the same level and substantially in the same perpendicular transverse plane as the coupling point 7 of the front axle to the vehicle frame. Hereby an influence on the steering is substantially prevented during rebounding of the front axle.

Figure 4:
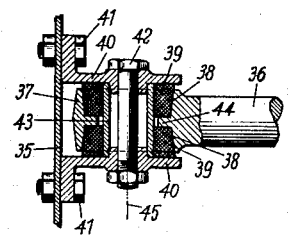
Figure 4 shows a ball and socket type joint between one axle part and the vehicle frame in longitudinal cut, also to a larger scale.

The ball and socket type joints 7, 8, 22, 23, 24, 25 are advantageously developed in accordance with Figure 4. Herein 35 designates a holder arm, which is attached to the vehicle frame 9, or to one of the axles 5, 6, while 36 signifies either the end of one of the transverse guides 20, 21 or a tie bolt, which is attached to the struts 10, 11. The head 37 of the bolt is provided on each side with a socket-shaped groove 38, in each of which a ring-shaped rubber buffer 39 is arranged.

The buffers 39 stand out beyond the sides of the head 37 to a certain extent and lie with their outside surfaces against the brackets 40, which are connected to the holder arm 35 by screws 41. Besides this the two brackets are tightly drawn against the surafces of a distance piece or bushing 43 so that the rubber buffers are subjected on all sides to a certain stress adjacent to the walls of the grooves 38, to the holding brackets 40 and to the distance piece or bushing 43. The distance piece fits with radial play or clearance within the web 44 of the head 37, which remains between the grooves 38. In this manner a joint is created, which can be manufactured at low cost and requires no lubrication at all nor other servicing and permits to the rod end 36 a rotating movement not only around the axis 45, but to the required degree also around the two axes vertical to it, and absorbs hereby all shocks in an elastic manner.

In the example of construction a vehicle is shown with a separate vehicle frame, which is to a great extent independent from the carriage body. It is self-evident that the invention is applicable as well to a vehicle with self-supporting carriage body, wherein the axles are suspended from a bed-plate of the carriage body. Therefore also such a construction is to be understood by "chassis." Furthermore by "rigid axle" any axle is to be understood in contrast to an independent wheel suspension.

What I claim is:

1. A vehicle axle suspension comprising a chassis, a rigid front axle, a rigid rear axle, a cantilever support for each axle extending forwardly thereof and connected thereto, deformable connection means for connecting each support to the chassis in the central longitudinal plane of the vehicle for swinging movement in all directions, spring means suspending each axle in a vertical direction, and means separate from the spring means supporting each axle transversely to the direction of vehicle travel and comprising a transverse guide rod connected at one end to the chassis and at the other end to the associated axle, the connection to the chassis and to the axle comprising a flexible connection, the connections between the guide rods and the chassis and between the guide rods and the axles for the one axle being located on the opposite side of the vehicle with respect to those for the other axle.

2. A vehicle axle suspension in accordance with claim 1 wherein the connections include rubber buffers to prevent a metallic connection between the guide rods and the chassis.

3. A vehicle axle suspension comprising a chassis, a rigid front axle, a rigid rear axle, a cantilever support for each axle, a universal joint coupling each support to the chassis, spring means suspending the axle from the chassis, a guide rod for each axle arranged transversely to the direction of travel, a universal joint coupling one end of each guide rod to the chassis and a universal joint coupling one end of each guide rod to one of the axles, at least one of the universal joints comprising a socket having an inwardly directed central flange on one of the parts to be connected, a pivot on the other parts to be connected entering into the socket of the other part through the flange with a predetermined clearance, a pair of supporting members engaging the outer face of the socket from both sides with a pre-determined clearance, and a pair of rubber rings located inside the socket and each held between the flange and one supporting member.

4. A vehicle axle suspension comprising a chassis, a rigid front axle, a rigid rear axle, a cantilever support connected to each axle, deformable connection means connecting each support to the chassis in the central longitudinal plane of the vehicle for swinging movement in all directions, spring means suspending each axle in a vertical direction, and means separate from the spring means supporting each axle transversely to the direction of vehicle travel and comprising a transverse guide rod connected at one end to the chassis on one side of said plane and at the other end to the associated axle on the other side of said plane, the connection to the chassis and to the axle comprising a deformable connection, the connections between the guide rods and the chassis and between the guide rods and the axles for the one axle being located on the opposite side of the vehicle with respect to those for the other axle.

References Cited in the file of this patent

UNITED STATES PATENTS

| Number | Name | Date |
|---|---|---|
| 1,069,334 | Humphrey | Aug. 5, 1913 |
| 2,198,099 | White | Apr. 23, 1940 |
| 2,269,452 | Ford | Jan. 13, 1942 |
| 2,322,890 | Slack | June 29, 1943 |
| 2,536,337 | Whitlow | Jan. 2, 1951 |

FOREIGN PATENTS

| Number | Country | Date |
|---|---|---|
| 405,511 | France | Nov. 17, 1909 |